(12) United States Patent
Frederick et al.

(10) Patent No.: US 11,235,403 B2
(45) Date of Patent: Feb. 1, 2022

(54) ELECTRICAL DISCHARGE MACHINING ELECTRODES AND ASSOCIATED METHODS

(71) Applicant: PRATT & WHITNEY CANADA CORP., Longueuil (CA)

(72) Inventors: Michel Frederick, Candiac (CA); Greg Maccaul, St-Lazarre (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 292 days.

(21) Appl. No.: 16/592,847

(22) Filed: Oct. 4, 2019

(65) Prior Publication Data
US 2021/0101216 A1    Apr. 8, 2021

(51) Int. Cl.
| B23H 7/12 | (2006.01) |
| B23H 1/04 | (2006.01) |
| B23H 1/02 | (2006.01) |
| B23H 7/18 | (2006.01) |
| B29L 31/60 | (2006.01) |
| B28B 3/20 | (2006.01) |

(52) U.S. Cl.
CPC ............. *B23H 7/12* (2013.01); *B23H 1/028* (2013.01); *B23H 1/04* (2013.01); *B23H 7/18* (2013.01); *B23H 2200/30* (2013.01); *B28B 2003/203* (2013.01); *B29L 2031/60* (2013.01)

(58) Field of Classification Search
CPC ....................................................... B23H 1/028
See application file for complete search history.

(56) References Cited

U.S. PATENT DOCUMENTS

| 2,719,902 | A | | 10/1955 | Flynn | |
| 4,476,369 | A | | 10/1984 | Inoue | |
| 4,563,800 | A | * | 1/1986 | Bonga | B23H 7/26 |
| | | | | | 219/69.1 |
| 5,028,755 | A | * | 7/1991 | Pertler | B23H 9/00 |
| | | | | | 219/69.2 |
| 6,261,153 | B1 | | 7/2001 | Dickerson et al. | |
| 6,566,623 | B2 | * | 5/2003 | McPhillips | B23H 1/02 |
| | | | | | 219/69.17 |
| 2008/0196237 | A1 | | 8/2008 | Shinya et al. | |
| 2017/0282267 | A1 | * | 10/2017 | Gao | B23H 1/04 |

* cited by examiner

*Primary Examiner* — Geoffrey S Evans
(74) *Attorney, Agent, or Firm* — Norton Rose Fulbright Canada LLP (57) ABSTRACT

An electrical discharge machining (EDM) electrodes and associated methods are provided. An EDM electrode includes a holder rotatable about a rotation axis and a plurality of electrode elements attached to the holder and circumferentially arranged around the rotation axis. Respective positions of the electrode elements are radially adjustable relative to the rotation axis.

20 Claims, 11 Drawing Sheets

ELECTRICAL DISCHARGE MACHINING ELECTRODES AND ASSOCIATED METHODS

TECHNICAL FIELD

This disclosure relates generally to electrical discharge machining, and more particularly to electrodes for electrical discharge machining.

BACKGROUND

Electrical discharge machining (EDM) is a thermoelectric manufacturing process whereby a desired shape is obtained by removing material from a work piece using electrical discharges (sparks). Material removal is achieved by rapidly recurring current discharges between a tool electrode and a work piece which are separated by a dielectric liquid and subject to an electric voltage. When the electrical energy is discharged, it ionizes a path through the dielectric fluid and vaporizes a region of the work piece.

The EDM process can also cause wear of the tool electrode due to particles eroding away from the electrode and eventually causing dimensional changes to the electrode. The number of components that can be machined with the same electrode will depend on the amount of wear that exists on the electrode and the dimensional tolerances acceptable on the component. When the amount of wear on the electrode is no longer acceptable, the electrode must be replaced.

SUMMARY

In one aspect, the disclosure describes an electrical discharge machining (EDM) electrode comprising:
  a holder rotatable about a rotation axis: and
  a plurality of electrode elements attached to the holder and circumferentially arranged around the rotation axis, respective positions of the electrode elements being radially adjustable relative to the rotation axis.

In another aspect, the disclosure describes a method of refurbishing an electrical discharge machining (EDM) electrode including a plurality of electrode elements attached to a holder rotatable about a rotation axis. The electrode elements are circumferentially arranged around the rotation axis. The method comprises: adjusting a position of one or more of the plurality of electrode elements radially outwardly relative to the rotation axis; and using a material removal process to form a substantially circular radially-outer periphery of the electrode cooperatively defined by the plurality electrode elements.

In a further aspect, the disclosure describes a method of machining components using an electrical discharge machining (EDM) electrode including a plurality of electrode elements attached to a holder rotatable about a rotation axis. The electrode elements are circumferentially arranged around the rotation axis. The method comprises:
  machining a first component using the EDM electrode;
  refurbishing the EDM electrode by:
    adjusting a position of one or more of the plurality of electrode elements radially outwardly relative to the rotation axis; and
    using a material removal process to form a substantially circular radially-outer periphery of the electrode cooperatively defined by the plurality electrode elements; and
  after refurbishing the EDM electrode, machining a second component using the EDM electrode.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The following disclosure describes a multi-element electrical discharge machining (EDM) electrode that can be refurbished to, in some situations, increase its useful life, reduce machining time and reduce material costs. The EDM electrode includes a holder rotatable about a rotation axis and a plurality of electrode elements attached to the holder and circumferentially arranged around the rotation axis. Respective positions of the electrode elements are radially adjustable relative to the rotation axis to permit refurbishing of the electrode. For example, the electrode can be refurbished after some use and wear by radially outwardly moving the electrode elements and grinding the electrode elements in order to restore a desired outer diameter of the electrode. Methods of refurbishing the electrode and using the electrode for machining components having a honeycomb structure are also disclosed.

The term "substantially" as used herein may be applied to modify any quantitative representation which could permissibly vary without resulting in a change in the basic function to which it is related.

Aspects of various embodiments are described through reference to the drawings.

Figure 1:
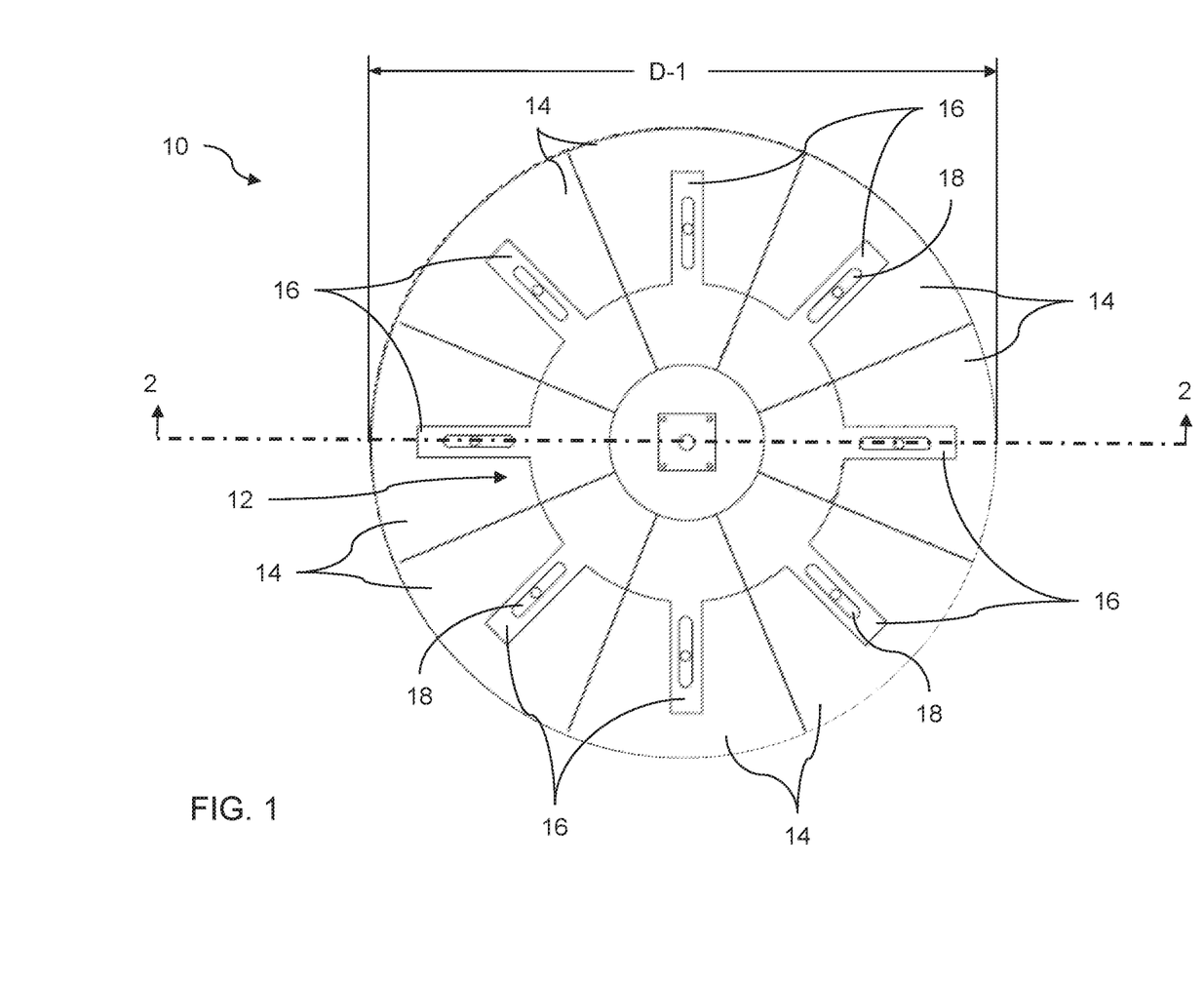
FIG. 1 is a schematic top plan view of an exemplary EDM electrode.
Figure 2:
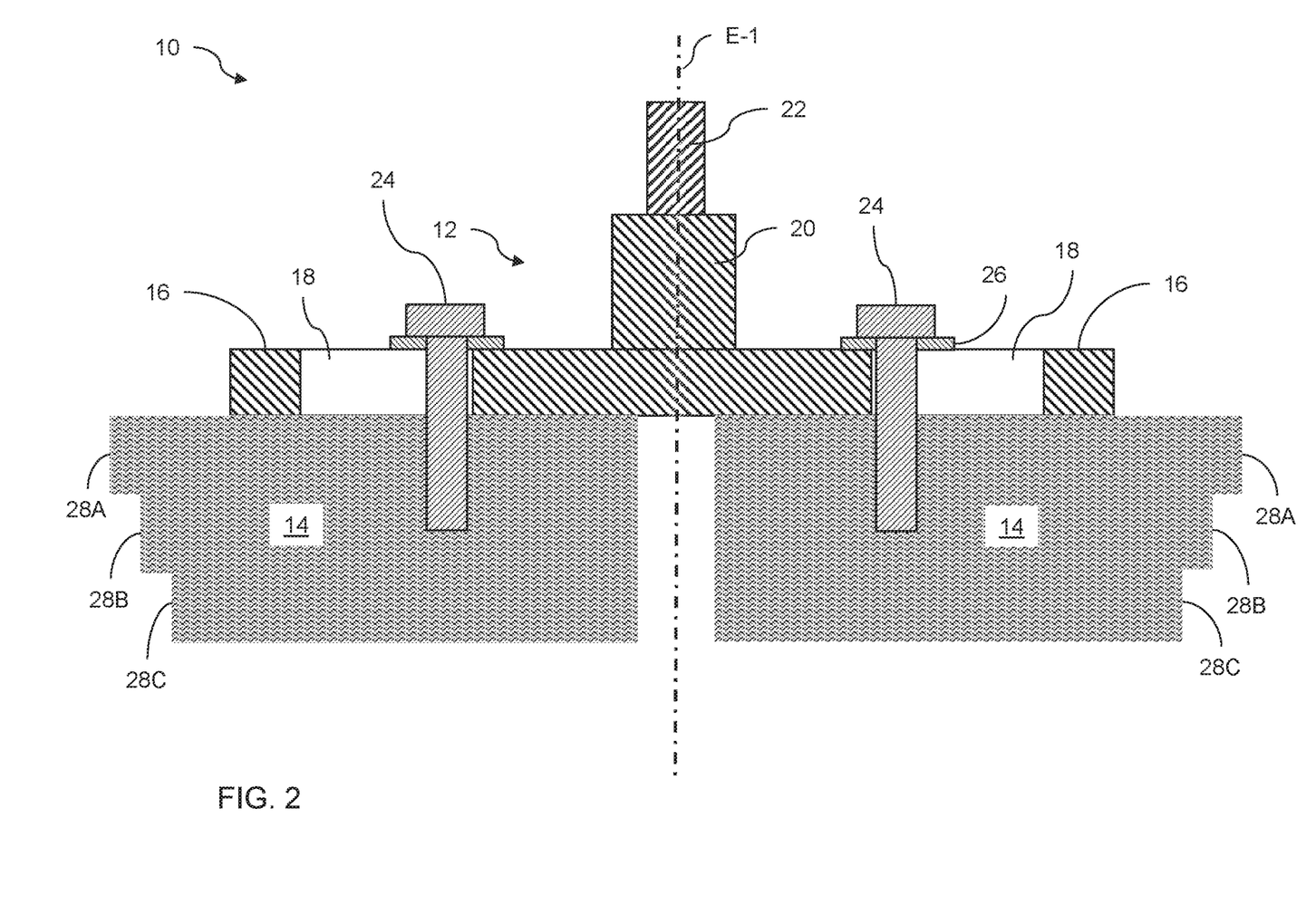
FIG. 2 is schematic cross-sectional view of the EDM electrode of FIG. 1 taken along line 2-2 in FIG. 1.

FIG. 1 is a top plan view of an exemplary EDM electrode 10 and FIG. 2 is a cross-sectional view of electrode 10 taken along line 2-2 of FIG. 1. As illustrated in FIGS. 1 and 2, electrode 10 includes holder 12 rotatable about rotation axis E-1 of electrode 10. Electrode 10 includes a plurality of electrode elements attached to holder 12 and circumferentially arranged around rotation axis E-1. Respective positions of electrode elements 14 are radially adjustable relative to rotation axis E-1. In some embodiments, electrode elements 14 are made of graphite. However, it is understood that electrode elements 14 could instead be made of another material suitable for EDM such as brass, copper, copper alloys, molybdenum, silver or silver tungsten, for example.

Electrode elements 14 may be adjustably attached to holder 12 via respective slotted mounts 16. Mounts 16 may each have a radially-extending thru slot 18 formed therein. Mounts 16 may be attached to central hub 20. In some embodiments, central hub 20 and mounts 16 may be integrally formed to have a unitary construction. For example, mounts 16 and central hub 20 could be machined from a common blank. Alternatively, mounts 16 may be integrally formed to have a unitary construction and subsequently attached to central hub 20 by welding or by threaded engagement. For example, mounts 16 may be machined out of a single plate and central hub 20 could be machined from round bar stock and subsequently assembled with the machined plate having the mounts 16 formed therein. Holder 12 may also include adapter 22 configured to couple with an EDM machine (not shown). For example, adapter 22 may be configured to be retained in a chuck of the EDM machine. For example, adapter 22 may be configured to be retained by a clamping system sold under the trade name "EROWA" or "SYSTEM 3R". Holder 12 may be made from a suitable electrically-conductive and metallic material such as steel for example.

Electrode elements 14 may be releasably engaged with respective radially-extending slots 18 formed into respective mounts 16 via bolts 24 (shown in FIG. 2) and optional washers 26. One or more bolts 24 may be used to releasably attach each electrode element 14 to a respective mount 16. Bolts 24 may extend through respective slots 18 of mounts 16 and be threaded into respective electrode elements 14. Tightening of bolts 24 may permit the positions of electrode elements 14 to be fixed relative to mounts 16 while loosening of bolts 24 may permit positional adjustment of electrode elements 14 relative to mounts 16. As explained further below, positional adjustment of electrode elements 14 may be made along slots 18 (i.e., radially relative to rotation axis E-1).

In reference to FIG. 1, electrode elements 14 may cooperatively define a substantially circular radially-outer periphery of electrode 10. In the illustrated embodiment, electrode elements 14 are shown as being sector-shaped (e.g., pie-shaped) but it is understood that electrode elements 14 of other shapes could also be used. Since electrode 10 may be rotated about rotation axis E-1 during the EDM process, it may be acceptable to have gaps between electrode elements 14 in some situations. In the illustrated embodiment, electrode 10 has eight electrode elements 14 but it is understood that electrode 10 could be configured to accommodate another number (e.g., three, four, six, ten) of electrode elements 14.

In some embodiments, the outer periphery of electrode 10 defined by electrode elements 14 may be radially varying (e.g., stepped, tapered) across the thickness (along rotation axis E-1) of electrode elements 14. In reference to FIG. 2, the outer periphery of electrode 10 may be stepped. For example, each electrode element 14 may have two, three or more radially-outer and axially-adjacent surfaces 28A-28C disposed at different radial distances from rotation axis E-1. Each radially-outer surface 28A-28C may have an arcuate profile when viewed along rotation axis E-1. Radially-extending steps may be disposed between axially-adjacent surfaces 28A-28C. Alternatively, in some embodiments, the outer periphery of electrode 10 defined by electrode elements 14 may be radially uniform such that the outer diameter D-1 of electrode 10 is substantially constant across the thickness (along rotation axis E-1) of electrode elements 14 (e.g., see FIG. 4B).

Figure 3:
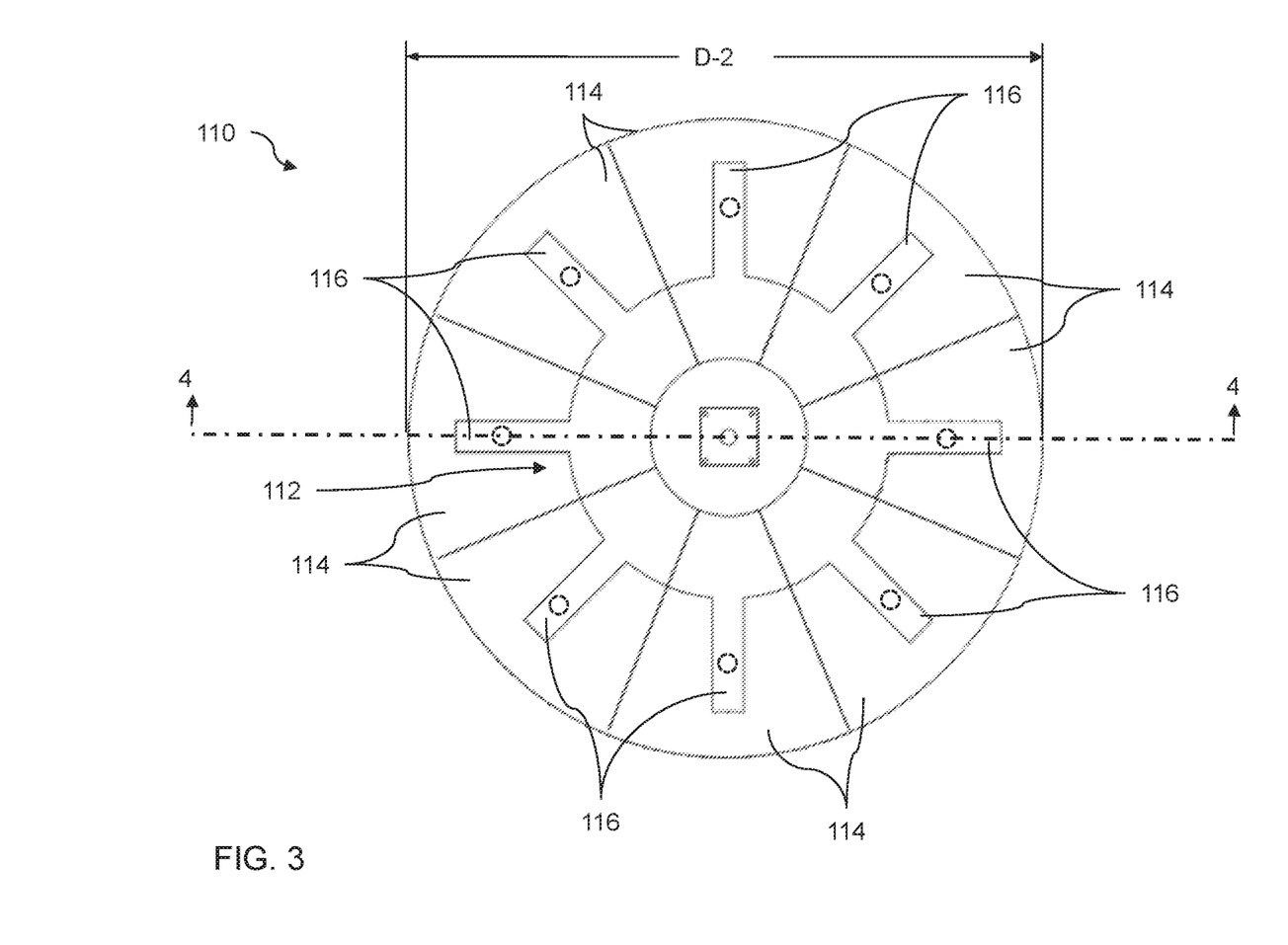
FIG. 3 is a schematic top plan view of another exemplary EDM electrode.

FIG. 3 is a top plan view of another exemplary EDM electrode 110.

Figure 4A:
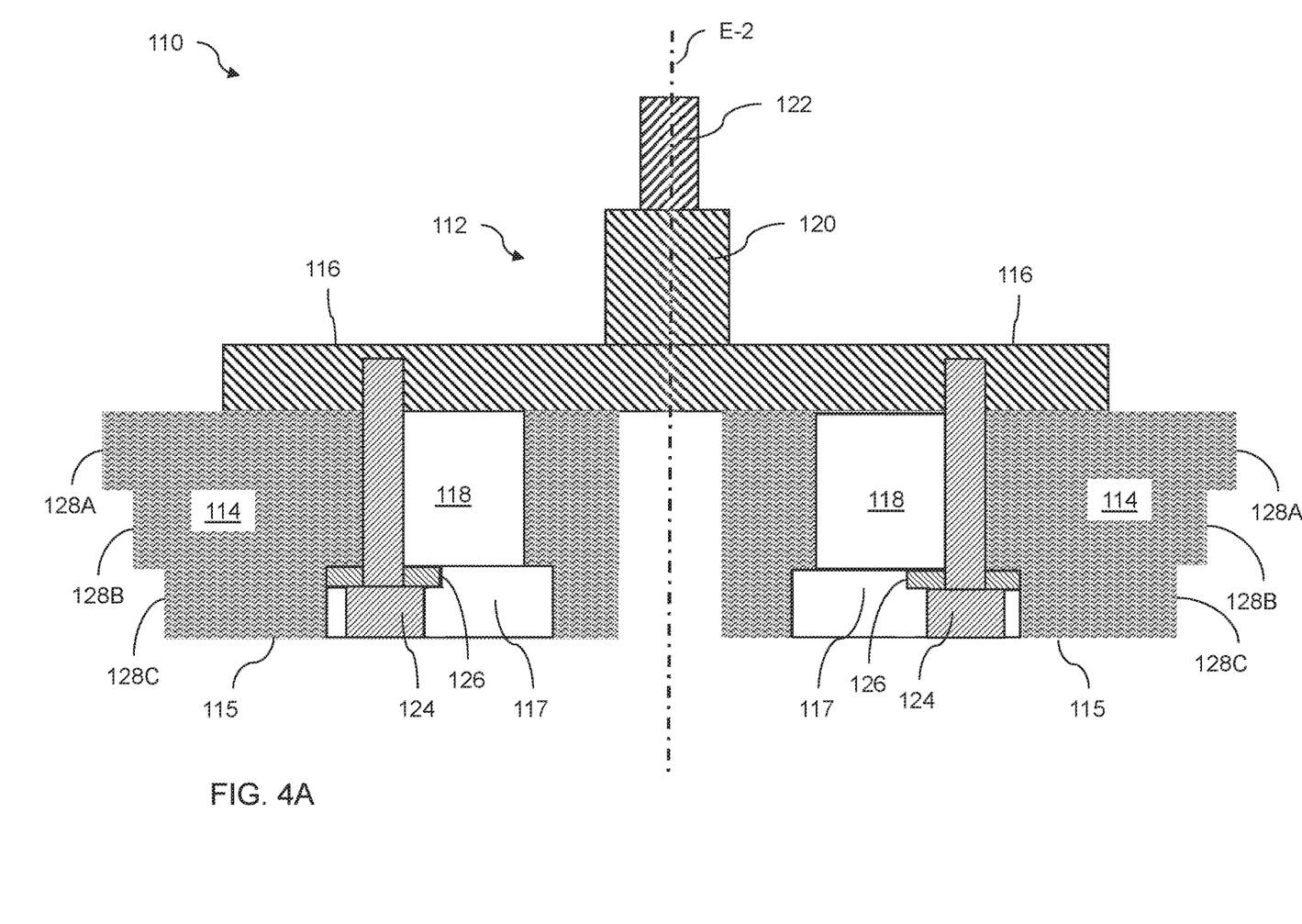
FIG. 4A is a schematic cross-sectional view taken along line 4-4 of FIG. 3 of the EDM electrode of FIG. 3 according to one embodiment.

FIG. 4A is a cross-sectional view of electrode 110 taken along line 4-4 of FIG. 3 having electrode elements 114 that are radially varying (e.g., stepped) across the thickness (along rotation axis E-2). For example, each electrode element 14 may have two, three or more radially-outer and axially-adjacent surfaces 128A-128C disposed at different radial distances from rotation axis E-2. Each radially-outer surface 128A-128C may have an arcuate profile when viewed along rotation axis E-2. Radially-extending steps may be disposed between axially-adjacent surfaces 128A-128C.

Figure 4B:
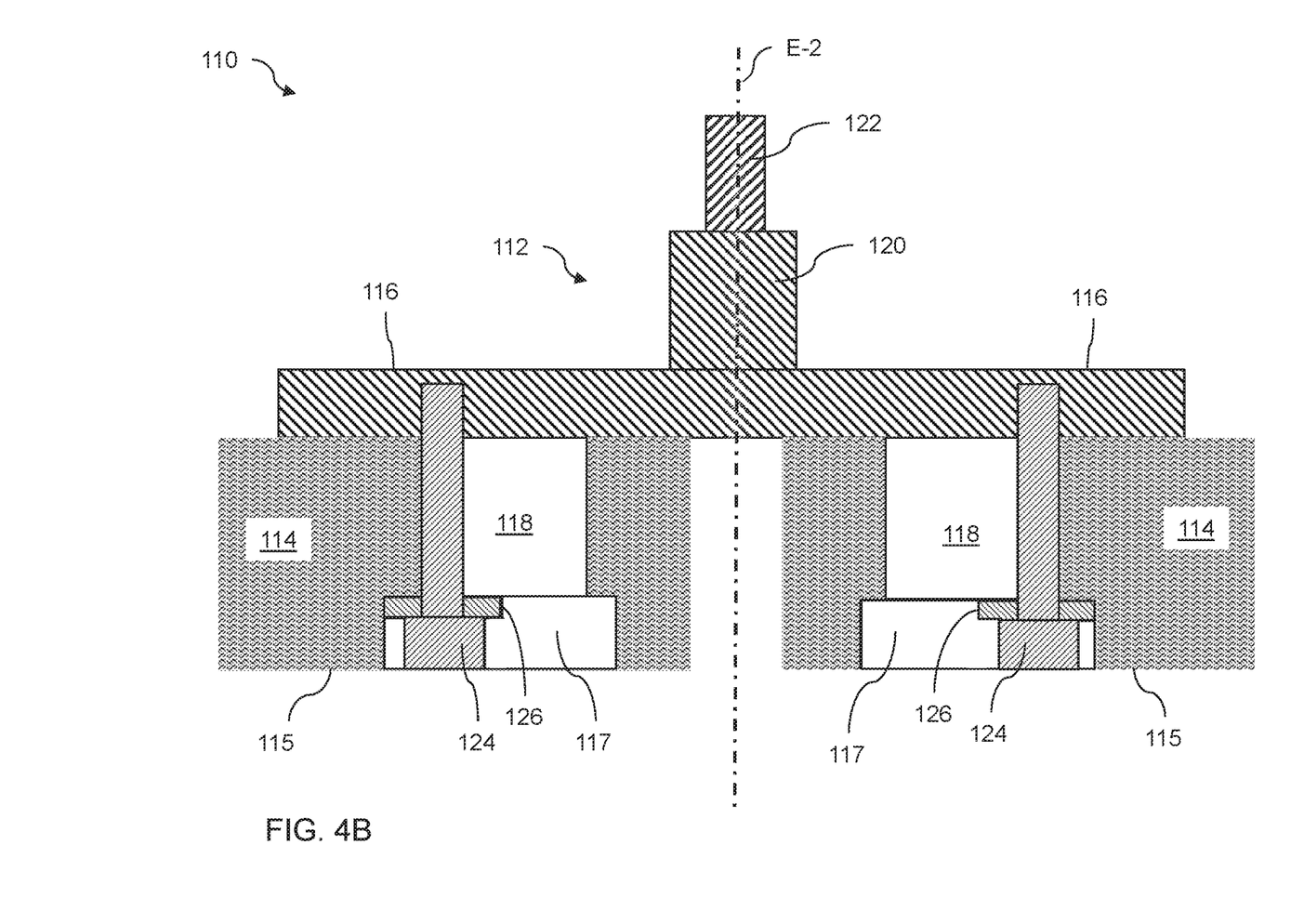
FIG. 4B is a schematic cross-sectional view taken along line 4-4 of FIG. 3 of the EDM electrode of FIG. 3 according to another embodiment.

FIG. 4B is a crss-sectional view of electrode 110 taken along line 4-4 having electrode elements 114 that are radially uniform such that the outer diameter D-2 is substantially constant across the thickness (along rotation axis E-2). It is understood that electrode 10 shown in FIG. 1 may also have electrode elements 14 that are radially uniform as shown in FIG. 4B.

In reference to FIGS. 3-4B, some elements of electrode 110 are common to electrode 10 described above. Reference characters of like elements have been incremented by 100 and their description is not repeated.

Electrode 110 includes a plurality of electrode elements 114 attached to holder 112 and circumferentially arranged around rotation axis E-2. Respective positions of electrode elements 114 are radially adjustable relative to rotation axis E-2. Electrode elements 114 may be adjustably attached to holder 112 via respective mounts 116. Electrode elements 114 may each have a radially-extending slot 118 (shown in FIGS. 4A and 4B) formed therein. Mounts 116 may be attached to central hub 120.

Electrode elements 114 may be releasably engaged with respective mounts 116 via bolts 124 (shown in FIGS. 4A and 4B) and optional washers 126. Electrode elements 114 may have recesses 117 (e.g., counterbore) defined within respective lower surfaces 115 of the electrode elements 114. One or more bolts 124 may be used to releasably attach each electrode element 114 to a respective mount 116. Bolts 124 may extend through respective slots 118 of electrode elements 114 and be threaded into respective mounts 116. Bolts 124 may have bolt heads that fit within respective recesses 117 of electrode elements 114. A surface of each bolt head may be flush with or recessed within a respective lower surface 115 of a respective electrode element 114. Tightening of bolts 124 may permit the positions of electrode elements 114 to be fixed relative to mounts 116 while loosening of bolts 124 may permit positional adjustments of electrode elements 114 relative to mounts 116 by permitting bolts 124 to slide in respective slots 118.

It is understood that other means of releasably attaching (e.g. clamping) electrode element 14, 114 to holder 12, 112 would be suitable.

Figure 5:
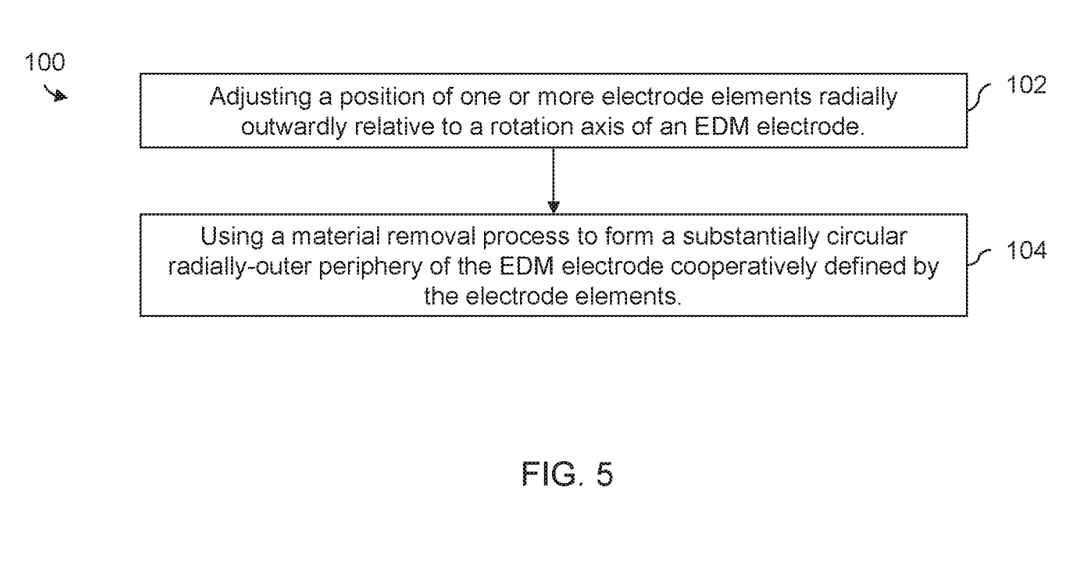
FIG. 5 is a flow diagram of a method for refurbishing an EDM electrode.

FIG. 5 is a flow diagram of a method 100 for refurbishing an EDM electrode. Method 100 may be performed using electrode 10 or electrode 110 described above. Aspects of method 100 can be combined with aspects of other methods described herein. Method 100 includes: adjusting a position of one or more electrode elements 14, 114 radially outwardly relative to rotation axis E-1, E-2 (see block 102); and using one or more material removal processes to form a substantially circular radially-outer periphery of electrode 10, 110 cooperatively defined by electrode elements 14, 114 (see block 104).

Figure 6:
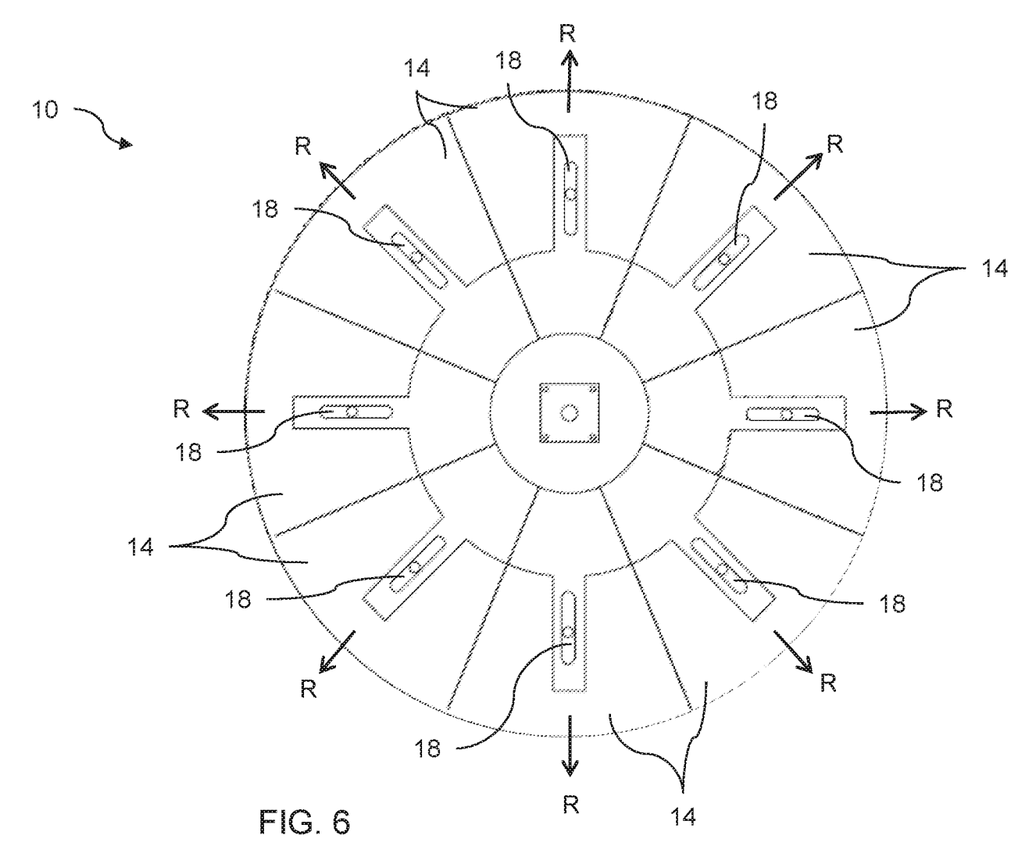
FIG. 6 is a schematic top plan view of the electrode of FIG. 1 showing positional adjustment of electrode elements.

FIG. 6 is a top plan view of electrode 10 of FIG. 1 showing positional adjustment of electrode elements 14 along arrows R. In reference to block 102 of FIG. 3, adjusting a position of one or more electrode elements 14 radially outwardly relative to rotation axis E-1 may include:

releasing the one or more electrode elements 14 from respective mounts 16 by loosening bolts 24 (shown in FIG. 2) for example;

moving the one or more electrode elements 14 along respective radially-extending slots 18; and releasably attaching the one or more electrode elements 14 to respective mounts 16.

In some embodiments, all of electrode elements 14 may be moved radially outwardly and releasably attached to mounts 16. However, if the wear is uneven among electrode elements 14, it is possible that only some of electrode elements 14 may require positional adjustment in order to refurbish electrode 10 in order to restore the outer diameter D-1 of electrode 10. It is understood that similar radial adjustment of electrode elements 114 of electrode 110 can be made.

Figure 7:
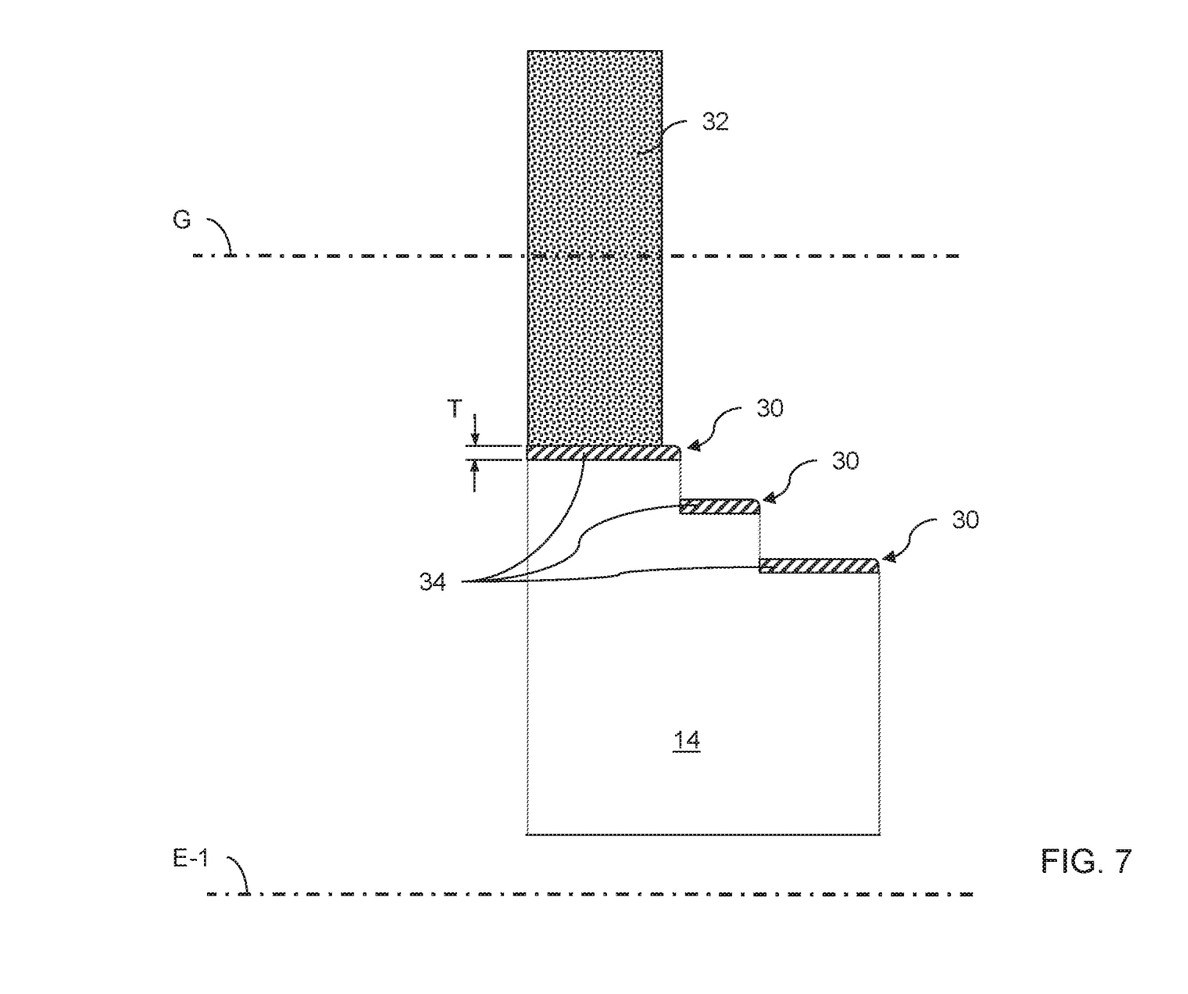
FIG. 7 is schematic representation of a process of grinding the electrode elements to restore a desired outer diameter of the electrode.

FIG. 7 is schematic representation of a process of grinding electrode elements 14 to restore the desired outer diameter D-1 (shown in FIG. 1) of electrode 10. After some utilization of EDM electrode 10, it is possible that some wear (erosion) of electrode elements 14 would occur. Such wear may be exhibited in the form of changes in shape of electrode elements 14, a reduced outer diameter of electrode 10 and/or rounding of corners 30 as shown in in FIG. 7. As a result, electrode 10 may become inadequate for continued EDM to achieve the desired dimensional tolerances on the work piece. In reference to block 104 of FIG. 5, once electrode elements 14 have been adjusted radially outwardly, one or more material removal processes may then be used to form a substantially circular radially-outer periphery of electrode 10 cooperatively defined by electrode elements 14 in order to restore the desired diameter D-1 of electrode 10. The amount of positional adjustment of electrode elements 14 (i.e., radial expansion of electrode 10) may be determined based on the amount and type of wear so that performing the material removal process will result in the desired outer diameter D-1 being restored.

FIG. 7 schematically illustrates one electrode element 14 after having been radially adjusted, together with grinding wheel 32 that may be used to remove material 34 in order to restore the desired diameter and radially-outer profile of electrode element 14. Electrode elements 14 may be mounted to holder 12 (not shown in FIG. 7) during the material removal process(es). The material removal process(es) may include grinding, machining and/or sanding for example. In the example of FIG. 7, grinding wheel 32 may be rotated about axis G while electrode 10 is held in a chuck or fixture (not shown) while circumferential grinding is conducted with grinding wheel 32. For example, electrode 10 may be rotated about rotation axis E-1 during grinding, or, grinding wheel 32 may be rotated about rotation axis E-1 while also spinning about axis G. One or more grinding passes may be performed to remove the desired thickness T of material 34 to restore the diameter D-1 of electrode 10. Positional adjustment of grinding wheel 32 relative to electrode 10 may be required to grind different radially-outer surfaces 28A-28B (shown in FIG. 2) of electrode 10. It is understood that similar grinding of electrode elements 114 of electrode 110 can be made.

Figure 8:
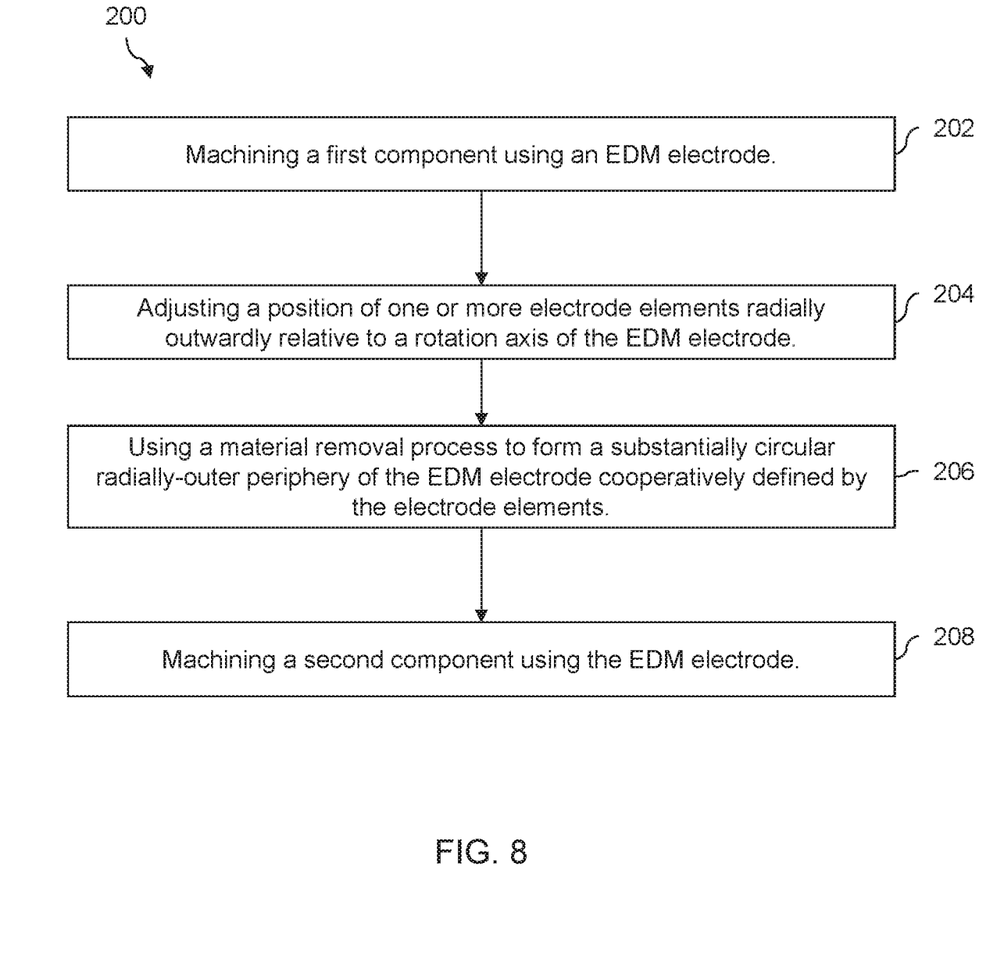
FIG. 8 is a flow diagram of a method of machining components using an EDM electrode.

FIG. 8 is a flow diagram of a method 200 of machining components using an EDM electrode. Method 200 may be performed using electrode 10, 110 described above. Aspects of method 200 can be combined with aspects of other methods described herein. Method 200 includes:

machining one or more first components using electrode 10, 110 (see block 202);

refurbishing the electrode 10, 110 by:

adjusting a position of one or more electrode elements 14, 114 radially outwardly relative to rotation axis E-1, E-2 (see block 204); and using a material removal process to form a substantially circular radially-outer periphery of electrode 10, 110 cooperatively defined by the electrode elements 14, 114 (see block 206): and after refurbishing electrode 10, 110, machining one or more second components using electrode 10, 110 (see block 208).

Refurbishing of electrode 10, 110 may be used to extend the useful life of electrode 10, 110. The refurbishing may be conducted after some wear of electrode 10, 110 has occurred during utilisation of electrode 10, 110 for EDM of one or more components. The refurbishing of electrode 10, 110 may then permit electrode 10, 110 to be used for machining additional one or more components. The refurbishing may remove the damage to electrode 10, 110 caused by wear and restore the outer diameter D-1, D-2 and radially-outer profile of electrode 10, 110. Refurbishing of electrode 10, 110 may be done one or more times until further reducing the size of electrode elements 14, 114 is not longer possible or practical.

Figures 9, 10A, 10B:
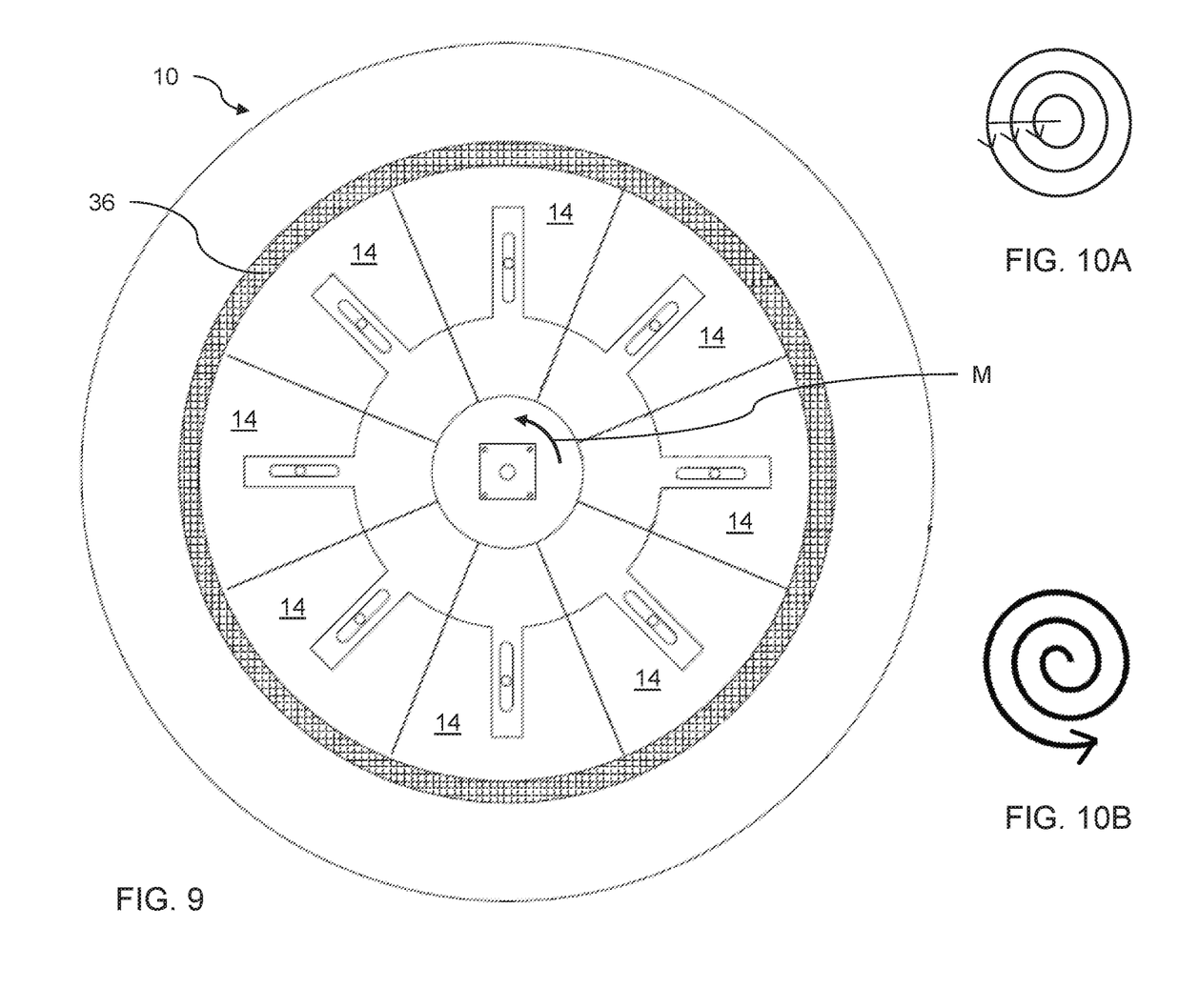
FIG. 9 is a schematic top plan view of the electrode of FIG. 1 during EDM of a work piece.
FIGS. 10A and 10B schematically illustrate exemplary tool paths that may be used during EDM of the work piece.

FIG. 9 is a top plan view of electrode 10 during EDM of work piece 36. Work piece 36 may be made from a nickel-based material. For example, work piece 36 may be made of an austenitic nickel-chromium-based superalloy of the family known as "INCONEL". In some embodiments, work piece 36 may have a honeycomb structure having relatively thin (e.g., around 0.002" or 0.5 mm) walls made of Inconel. In some embodiments, work piece 36 may have a relatively low machinability and therefore may be difficult to machine using conventional processes such as turning, milling and grinding for example. Work piece 36 may have a circular shape and the finished component made from work piece 36 may have an annular shape. Such finished component may be used as a sealing structure surrounding a bladed rotor inside a gas turbine engine for example. Accordingly, dimensional tolerances may be relatively tight and the presence of burrs inside the honeycomb cells should be avoided once machining is completed. It is understood that electrode 10 may be used to machine other types of components made of other materials.

Machining the component out of work piece 36 may include rotating electrode 10 about rotation axis E-1 (see arrow M) while plunging electrode 10 along rotation axis E-1 and into work piece 36. In some situations, the outer diameter D-1 (shown in FIG. 1) of electrode 10 and the radially outer profile of electrode elements 14 may substantially correspond to the inner diameter and radially inner profile of the cavity to be machined in work piece 36. In such situations, it may be sufficient to simply plunge electrode 10 into work piece 36 while rotating electrode 10 about rotation axis E-1. However, in some situations, the diameter D-1 of electrode 10 may be smaller than the inner diameter to be machined in work piece 36 and movement of electrode 10 transverse to rotation axis E-1 may be required in addition to spinning electrode 10 about rotation axis E-1 and plunging electrode 10 into work piece 36 along rotation axis E-1. Such transverse movement of electrode 10 may include a circular extrapolation in order to bring the inner cavity machined in work piece 36 to proper size.

In some situations, increased transverse movement of electrode 10 may result in increased time required to machine the desired cavity in work piece 36. Accordingly, it may be desirable to have the diameter D-1 of electrode 10 be relatively close to the diameter of the machined cavity in order to reduce the amount of transverse movement of electrode 10 required. The use of the refurbishing method described herein may be used to restore the diameter D-1 of electrode 10 to a value desirable for machining the cavity in work piece 36 and consequently avoid excessive transverse movement of electrode 10 being required during EDM.

FIGS. 10A and 10B schematically illustrate exemplary tool paths that may be used during EDM of work piece 36 using electrode 10 having a diameter D-1 that is smaller than the inner diameter of the cavity to be machined into work piece 36. FIG. 10A shows concentric circles that can be used to gradually expand the diameter of the cavity that is being machined in work piece 36. FIG. 10B shows a spiral-shaped tool path that can be used to gradually expand the diameter of the cavity that is being machined in work piece 36. The relative movement between electrode 10 and/or of work piece 36 may be controlled by a computer numerical control (CNC) motion system of an EDM system to which electrode is mounted. Work piece 36 and electrode 10 may be submerged in a dielectric fluid, which cools the EDM process and helps dispose of material removed from work piece 36 during the EDM process.

Figure 11:
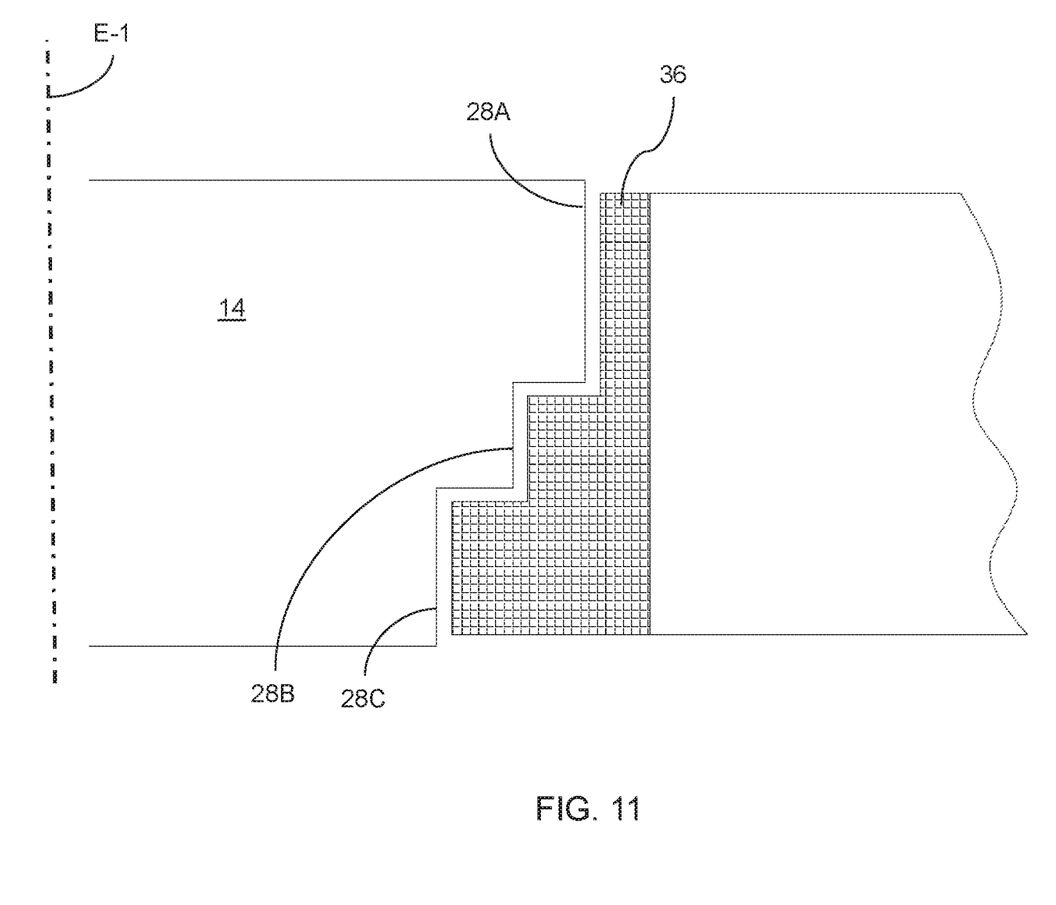
FIG. 11 is a schematic elevation view of the electrode of FIG. 1 during EDM of the work piece.

FIG. 11 is a schematic elevation view of electrode 10 during EDM of work piece 36. The stepped outer periphery of electrode 10 cooperatively defined by electrode elements 14 can be used to machine a correspondingly stepped radially inner profile in the cavity formed in work piece 36. In some embodiments, when the outer periphery of electrode 10 is not stepped, electrode 10 may be plunged into work piece 36 multiple times at different locations on the work piece 36 to machine a cavity having a stepped radially inner profile.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An electrical discharge machining (EDM) electrode comprising:
    a holder rotatable about a rotation axis; and
    a plurality of electrode elements attached to the holder and circumferentially arranged around the rotation axis, respective positions of the electrode elements being radially adjustable relative to the rotation axis.

2. The electrode of claim 1, wherein:
    the electrode elements are attached to the holder via respective slotted mounts;
    the slotted mounts each have a radially-extending slot; and
    the electrode elements are releasably engaged with respective ones of the radially-extending slots.

3. The electrode of claim 1, wherein the electrode elements cooperatively define a substantially circular radially-outer periphery of the electrode.

4. The electrode of claim 1, wherein the electrode elements are each at least partially sector-shaped.

5. The electrode of claim 1, wherein the plurality of electrode elements includes eight electrode elements.

6. The electrode of claim 1, wherein each electrode element has two radially-outer and axially-adjacent surfaces disposed at different radial distances from the rotation axis.

7. The electrode of claim 6, wherein each electrode element has a radially-extending step between the axially-adjacent surfaces.

8. The electrode of claim 1, wherein:
    the electrode elements are attached to the holder via respective mounts; and
    each electrode has a radially-extending slot and is releasably engaged with the respective mount via a bolt extending through the radially-extending slot.

9. A method of refurbishing an electrical discharge machining (EDM) electrode including a plurality of electrode elements attached to a holder rotatable about a rotation axis, the electrode elements circumferentially arranged around the rotation axis, the method comprising:
    adjusting a position of one or more of the plurality of electrode elements radially outwardly relative to the rotation axis; and
    using a material removal process to form a substantially circular radially-outer periphery of the electrode cooperatively defined by the plurality electrode elements.

10. The method of claim 9, wherein the material removal process includes grinding.

11. The method of claim 9, wherein adjusting a position of one or more of the electrode elements radially outwardly relative to the rotation axis includes:
    releasing the one or more electrode elements from respective mounts;
    moving the one or more electrode elements along respective radially-extending slots; and
    releasably attaching the one or more electrode elements to the respective mounts.

12. The method of claim 9, wherein the substantially circular radially-outer periphery of the electrode includes two or more axially-adjacent portions at different radial distances from the rotation axis.

13. The method of claim 12, wherein the electrode includes a radially-extending step between the axially-adjacent portions.

14. A method of machining components using an electrical discharge machining (EDM) electrode including a plurality of electrode elements attached to a holder rotatable about a rotation axis, the electrode elements circumferentially arranged around the rotation axis, the method comprising:
    machining a first component using the EDM electrode;
    refurbishing the EDM electrode by:
        adjusting a position of one or more of the plurality of electrode elements radially outwardly relative to the rotation axis; and using a material removal process to form a substantially circular radially-outer periphery of the electrode cooperatively defined by the plurality electrode elements; and after refurbishing the EDM electrode, machining a second component using the EDM electrode.

15. The method of claim 14, wherein machining the second component includes rotating the electrode about the rotation axis while plunging the electrode along the rotation axis and into a work piece.

16. The method of claim 14, wherein machining the second component includes rotating the electrode about the rotation axis while moving the electrode transversely to the rotation axis.

17. The method of claim 16, wherein machining the second component includes moving the electrode along a path defined by circular extrapolation.

18. The method of claim 14, wherein the material removal process includes grinding.

19. The method of claim 14, wherein adjusting a position of one or more of the electrode elements radially outwardly relative to the rotation axis includes:

releasing the one or more electrode elements from respective mounts;

moving the one or more electrode elements along respective radially-extending slots; and releasably attaching the one or more electrode elements to the respective mounts.

20. The method of claim 14, wherein the second component has a honeycomb structure.

* * * * *